(12) United States Patent
Zimmer et al.

(10) Patent No.: US 7,689,817 B2
(45) Date of Patent: Mar. 30, 2010

(54) METHODS AND APPARATUS FOR DEFEATING MALWARE

(75) Inventors: Vincent J. Zimmer, Federal Way, WA (US); Qin Long, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 668 days.

(21) Appl. No.: 11/601,321

(22) Filed: Nov. 16, 2006

(65) Prior Publication Data

US 2008/0120499 A1    May 22, 2008

(51) Int. Cl.
G06F 9/24 (2006.01)
G06F 9/00 (2006.01)
G06F 9/455 (2006.01)

(52) U.S. Cl. .................................... 713/1; 713/2; 718/1
(58) Field of Classification Search .................. 713/1, 713/2
See application file for complete search history.

(56) References Cited

U.S. PATENT DOCUMENTS

| | | | | |
|---|---|---|---|---|
| 6,397,242 | B1 * | 5/2002 | Devine et al. ................... | 718/1 |
| 6,496,847 | B1 * | 12/2002 | Bugnion et al. ................. | 718/1 |
| 7,103,529 | B2 | 9/2006 | Zimmer | |
| 7,127,579 | B2 | 10/2006 | Zimmer et al. | |
| 2002/0169987 | A1 * | 11/2002 | Meushaw et al. ........... | 713/201 |
| 2003/0120856 | A1 * | 6/2003 | Neiger et al. ................... | 711/6 |
| 2003/0188165 | A1 * | 10/2003 | Sutton et al. ................. | 713/176 |
| 2005/0182940 | A1 * | 8/2005 | Sutton et al. ................. | 713/179 |

OTHER PUBLICATIONS

Utter Jun. 29, 2006—Blue Pill A Threat To Vista X64— http://www.securitypronews.com/news/securitynews/spn-45-20060629BluePillAThreatToVistax64.html.
Microsoft Oct. 20, 2006—CPU Virtualization Extensions: Analysis of Rootkit Issues Updated: Oct. 20, 2006—http://www.microsoft.com/whdc/system/platform/virtual/CPUVirtExt.mspx.
Ou Aug. 15, 2006—Blue Pill: The first effective Hypervisor Rootkit—http://blogs.zdnet.com/Ou/index.php?p=295.
Naraine Jun. 28, 2006—'Blue Pill' Prototype Creates 100% Undetectable Malware—http://www.eweek.com/article2/0,1895,1983037,00.asp.
Zimmer Jan. 2004—Advances in Platform Firmware Beyond BIOS and Across all Intel® Silicon—http://www.intel.com/technology/magazine/systems/it01043.pdf.
AMD May 2005—AMD64 Virtualization Codenamed "Pacifica" Technology, Secure Virtual Machine Architecture Reference Manual, Revision 3.01, May 2005.

* cited by examiner

*Primary Examiner*—Suresh K Suryawanshi
(74) *Attorney, Agent, or Firm*—D'Ann Naylor Rifai

(57) ABSTRACT

A data processing system supports a virtualization enabled (VE) operating mode. An operating system (OS) is launched during a boot process. However, a trap agent is launched before the OS is launched. The trap agent may intercept an attempt to transition the data processing system to virtual machine (VM) operating mode. In response to intercepting the attempt to transition the data processing system to VM operating mode, the trap agent may automatically determine whether the program that requested the transition is an authorized program. If the program is not authorized, the trap agent may prevent the program from transitioning the data processing system to VM operating mode. In one embodiment, the trap agent is launched before the data processing system selects a boot device. In another embodiment, the trap agent is launched before executing any code from any third-party option ROMs. Other embodiments are described and claimed.

25 Claims, 3 Drawing Sheets

METHODS AND APPARATUS FOR DEFEATING MALWARE

FIELD OF THE INVENTION

The present disclosure relates generally to the field of data processing, and more particularly to methods and related apparatus for defeating malware.

BACKGROUND

A data processing system may include hardware resources, such as a central processing unit (CPU), random access memory (RAM), read-only memory (ROM), etc. The processing system may also include software resources, such as a basic input/output system (BIOS), a virtual machine monitor (VMM), and one or more operating systems (OSs). When the computer system is started or reset, it may load the BIOS, and then the VMM. The VMM may include a root OS, or it may run on top of a root OS. The VMM may then create one or more virtual machines (VMs), and the VMs may boot to different guest OSs or to different instances of the same guest OS. The VMM may thus allow multiple OSs and applications to run in independent partitions.

The CPU in such a data processing system may provide hardware support (e.g., instructions and data structures) for virtualization. Additional details about virtualization may be found in reference manuals such as the following:

Intel® Virtualization Technology Specification for the IA-32 Intel® Architecture, dated April 2005 (hereinafter "the VT-x Specification"); and IA-32 Intel® Architecture Software Developer's Manual, Volume 2B: Instruction Set Reference, N-Z, dated June 2006.

Other manufacturers may produce processors with different features for supporting virtualization.

Unfortunately, computer viruses, worms, rootkits, or other types of malware may attempt to use virtualization features in support of malicious activities. For example, an article dated Jun. 28, 2006, on the www.eWeek.com website at article2/0, 1895,1983037,00.asp describes a "Blue Pill" rootkit that allegedly uses CPU virtualization features "to create an ultra-thin hypervisor that takes complete control of the underlying operating system."

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

U.S. Pat. No. 7,103,529 (hereinafter "'529")—which is assigned to the same assignee as the present application, and which involves a common inventor with the present application—pertains to a method for providing system integrity and legacy environment emulation. In particular, '529 describes a VMM to provide pre-boot security "up to and including OS loading." The present disclosure describes additional features for enhancing processing system security. As described in greater detail below, those features may be implemented, in whole or part, in a VM-entry trap agent (VTA). A data processing system may load the VTA relatively early during the boot process, for instance before the boot-device selection (DBS) phase or even before executing code from any third-party option ROMs. Once loaded, the VTA may intercept privileged instructions, such as instructions that would cause the processor to transition from a VMM operating mode to a VM operating mode. When the VTA traps such an instruction, the VTA may then determine whether the software module that requested the transition to VM operating mode is an authorized module. When an unauthorized software module is detected, the VTA may cause a general protection fault or other exception to bring the problem to attention and to prevent unauthorized operations.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Figure 1:
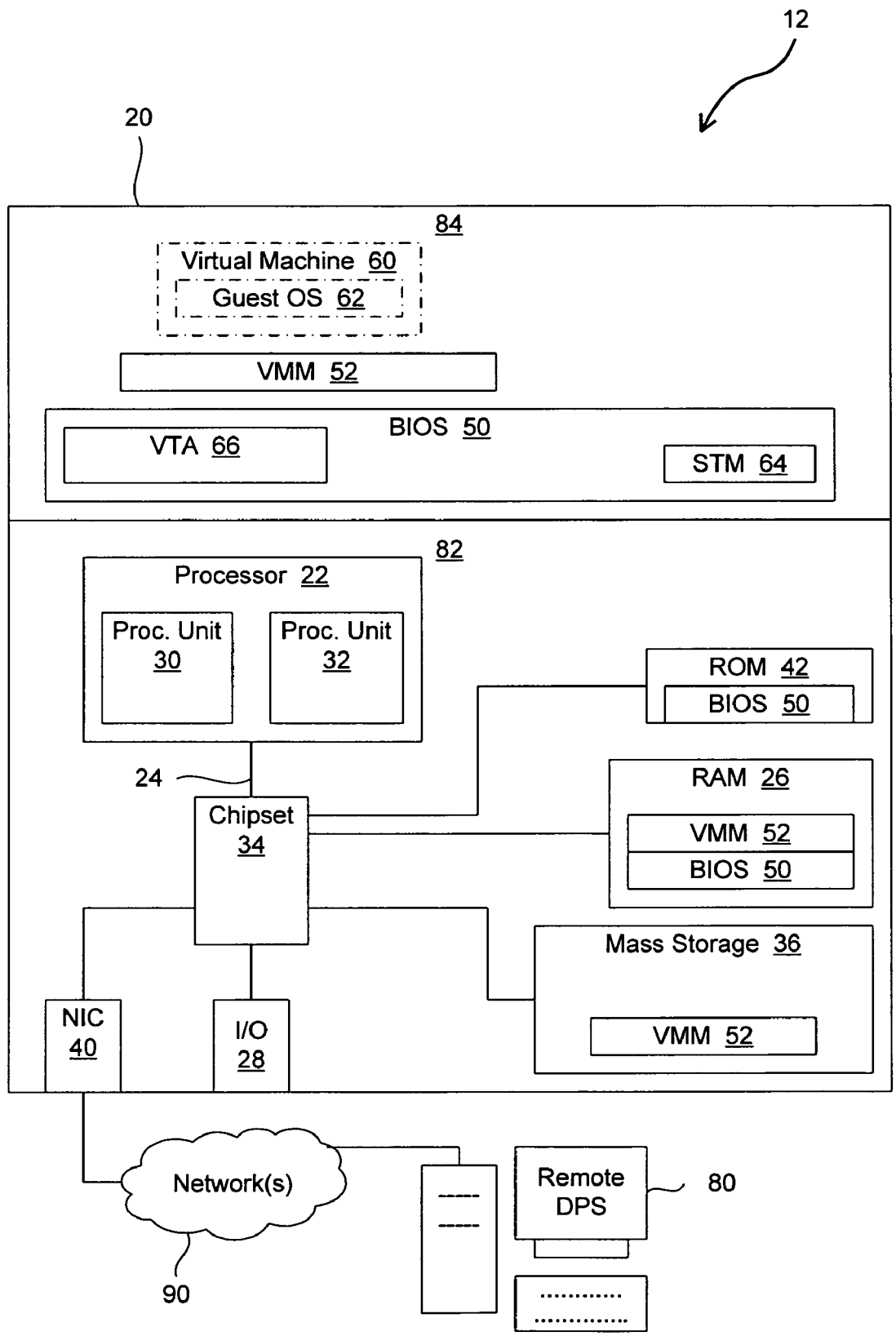
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that has various hardware components 82, such as a CPU 22 and various other components, which may be communicatively coupled via one or more system buses 24 or other communication pathways or mediums.

This disclosure uses the term "bus" to refer to shared communication pathways, as well as point-to-point pathways. CPU 22 may include two or more processing units, such as processing unit 30 and processing unit 32. Alternatively, a processing system may include a CPU with one processing unit, or multiple processors, each having at least one processing unit. The processing units may be implemented as processing cores, as Hyper-Threading (HT) technology, or as any other suitable technology for executing multiple threads simultaneously or substantially simultaneously.

In the embodiment of FIG. 1, processor 22 supports a virtual machine extension (VMX) operating mode and a non-VMX operating mode. The non-VMX operating mode (and any similar operating mode in other processors) may be referred to as a normal operating mode, a legacy operating mode, or a virtualization disabled (VD) mode. The VMX operating mode (and any similar operating mode in other processors) may be referred to as a virtualization enabled (VE) mode. When processor 22 is set to the VE mode, processor 22 may operate in either a VMX root operating mode or a VMX non-root operating mode. Typically, hypervisors or virtual machine monitors such as VMM 52 execute in the VMX root operating mode, while guest VMs such as VM 60 execute in the VMX non-root operating mode. For purposes of this disclosure, the term "VMM operating mode" refers to the VMX root operating mode and any similar operating mode in other processors, while the term "VM operating mode" refers to the VMX non-root operating mode and any similar operating mode in other processors.

For example, an alternative processing system may use a processor that enables virtualization in response to an EFER.SVME instruction and enters VM operating mode in response to a VMRUN instruction. In such an embodiment, when a prospective root OS or VMM executes EFER.SVME and VMRUN, the VTA may virtualize execution of the EFER.SVME instruction, trap the VMRUN instruction, and verify authorization of the root OS or VMM before allowing it to create the VM.

In the embodiment of FIG. 1, processor 22 is communicatively coupled to one or more volatile or non-volatile data storage devices, such as RAM 26, ROM 42, mass storage devices 36 such as hard drives, and/or other devices or media, such as floppy disks, optical storage, tapes, flash memory, memory sticks, digital video disks, etc. For purposes of this disclosure, the terms "read-only memory" and "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as a video controller, integrated drive electronics (IDE) controllers, small computer system interface (SCSI) controllers, universal serial bus (USB) controllers, input/output (I/O) ports, input devices, output devices such as a display, etc. A chipset 34 in processing system 20 may serve to interconnect various hardware components. Chipset 34 may include one or more bridges and/or hubs, as well as other logic and storage components.

Processing system 20 may be controlled, at least in part, by input from conventional input devices, such as a keyboard, a mouse, etc., and/or by directives received from another machine, biometric feedback, or other input sources or signals. Processing system 20 may utilize one or more connections to one or more remote data processing systems 80, such as through a network interface controller (NIC) 40, a modem, or other communication ports or couplings. Processing systems may be interconnected by way of a physical and/or logical network 90, such as a local area network (LAN), a wide area network (WAN), an intranet, the Internet, etc. Communications involving network 90 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

Some components, such as the video controller for example, may be implemented as adapter cards with interfaces (e.g., a PCI connector) for communicating with a bus. In some embodiments, one or more devices may be implemented as embedded controllers, using components such as programmable or non-programmable logic devices or arrays, application-specific integrated circuits (ASICs), embedded processors, smart cards, and the like.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations.

The programs in processing system 20 may be considered components of a software environment 84. For instance, when processing system 20 boots, a BIOS 50 may be retrieved from ROM 42, loaded into RAM 26, and executed within software environment 84. For instance, BIOS 50 may be implemented in accordance with Version 2.0 of the Unified Extensible Firmware Interface Specification, dated Jan. 31, 2006 (the "UEFI Specification"). The UEFI Specification is currently available from www.uefi.org/index.php?pg=4. Alternative embodiments of the present invention may use other types of boot processes.

As described in greater detail below, BIOS 50 may include a VM-entry trap agent (VTA) 66 and a system management interrupt (SMI) transfer monitor (STM) 64. BIOS 50 may progress through various phases during the boot process, and BIOS 50 may retain control of the instructions to be executed until a particular point in the boot process, such as completion of the boot-device selection (BDS) phase. Alternatively, BIOS 50 may temporarily transfer control to programs residing in non-volatile memory components other than the system ROM 42 before entering the BDS phase. After the boot device is selected, BIOS 50 may transfer control to software residing on the selected boot device. For example, BIOS 50 may hand off to VMM 52. VMM 52 may then create one or more VMs 60 to support one or more guest OSs 62.

However, VM 60 and guest OS 62 are depicted in dashed lines because VTA 66 may prevent VMM 52 from creating VMs if VMM 52 does not meet certain requirements. For instance, when VMM 52 attempts to create VM 60, VTA 66 may determine whether VMM 52 is authorized by taking a measurement (e.g., a hash) of VMM 52 and comparing that measurement against a white list of approved programs and/or a black list of disapproved programs. Such lists may be stored locally in non-volatile storage in processing system 20 and/or remotely (e.g., in remote data processing system 80). If VMM 52 is disapproved, VTA 66 may prevent VMM 52 from creating the VM, and VTA 66 may trigger a fault, exception, or other suitable event to provide notification of the situation. Additional details for an example embodiment are described below with regard to FIG. 2.

Figure 2:
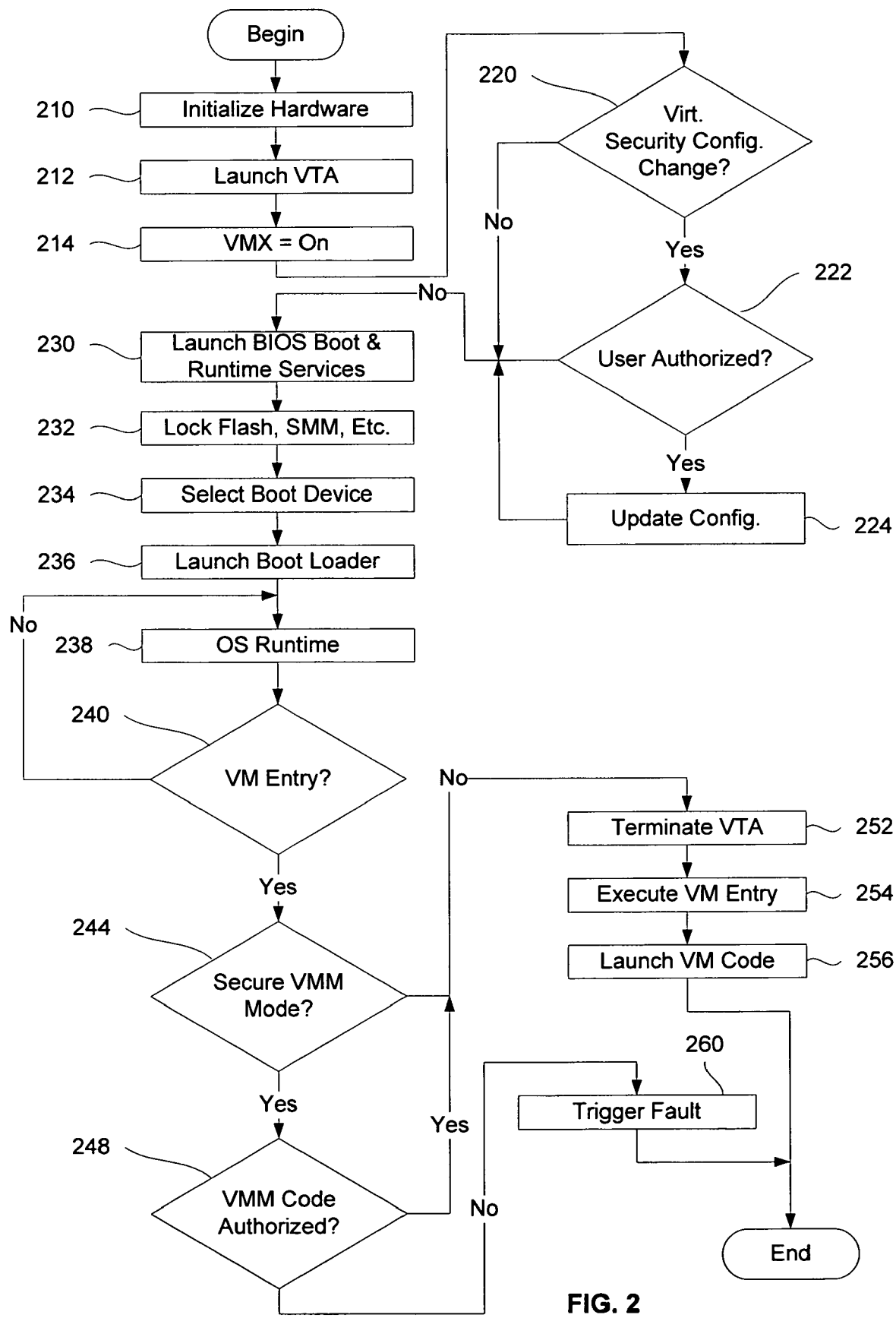
FIG. 2 is a flowchart of a process for booting the data processing system of FIG. 1, according to an example embodiment of the present invention.

FIG. 2 is a flowchart of an example process for booting processing system 20. That process may start in response to processing system 20 being powered on or reset. As shown at block 210, processing system 20 may then initialize hardware components such as RAM 26 and I/O components.

Figure 3:
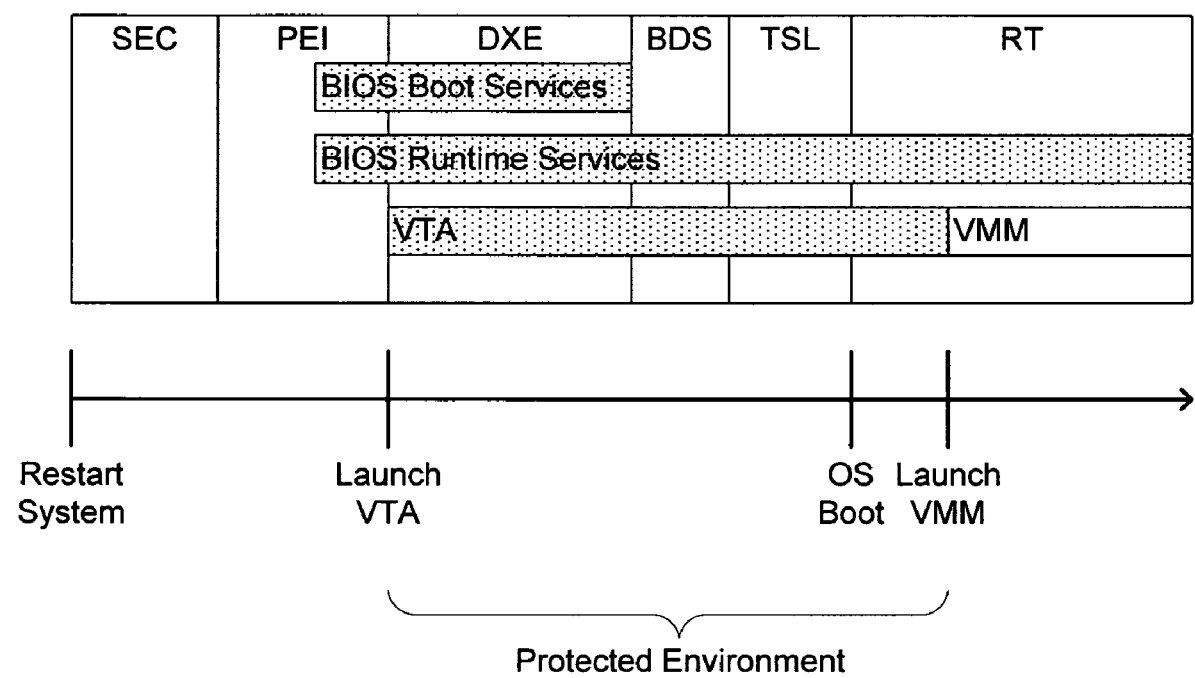
FIG. 3 depicts an example timeline associated with the process of FIG. 2.

Also, FIG. 3 depicts an example timeline associated with the process of FIG. 2. In particular, towards the bottom of FIG. 3 is a timeline that starts on the left when processing system 20 is started or reset, and proceeds to the right, with various events described and marked at different points in time. Above the timeline, six columns depict six phases that are associated with corresponding portions of the timeline, based on processing system 20 using a boot process that follows an extensible firmware interface (EFI) model, such as the model described in the UEFI Specification.

In particular, as shown in FIG. 3, processing system 20 may respond to a reset by progressing in order through phases such as the following: a security (SEC) phase, a pre-EFI initialization (PEI) phase, a driver execution environment (DXE) phase, a BDS phase, a transient system load (TSL) phase, and a runtime (RT) phase. However, the present invention is not limited to processing systems that follow the EFI model. For alternative embodiments of the present invention, data processing systems may use legacy models or other models for their boot processes.

Referring again to block 210 of FIG. 2, in the example embodiment, BIOS 50 may initialize some or all of the hardware during the PEI phase. As shown at block 212, BIOS 50 may then launch VTA 66. In particular, as indicated in FIG. 3, BIOS 50 may launch VTA 66 at the beginning of the DXE phase. In the example embodiment, processing system 20 launches VTA 66 before executing code from any third-party option ROMs, and before selecting a boot device. For purposes of this disclosure, the term "third-party option ROM" refers to non-volatile memory in a processing system that contains software which was not provided by the manufacturer of the CPU or the manufacturer of the motherboard.

Once launched, VTA 66 may provide a protected environment, as indicated by the curly bracket under the timeline in FIG. 3. VTA 66 may use further operations depicted in FIG. 2 to provide this protection, as described below.

As show at block 214, once VTA 66 has been launched, VTA 66 may update processor 22 to turn on VMX operating mode. This operation may cause processor 22 to transition from the normal operating mode to the VMX operating mode. If another program were to subsequently attempt to turn on VMX operating mode (e.g., using a VMX=ON instruction), VTA 66 may virtualize execution of that instruction.

As shown at block 220, BIOS 50 may then determine whether the virtualization security configuration is to be changed. For instance, the owner or administrator of processing system 20 may interact with processing system 20 during the boot process to request changes. The platform owner may provide some proof of ownership, such as the hash of a shared secret between the owner and the firmware, or a public key. If a change to the security configuration has been requested, BIOS 50 may then determine whether the current user is authorized to apply the changes, as shown at block 222. For instance, BIOS 50 may prompt the user for a password or for a biometric reading. If the user passes the authorization test, BIOS 50 may allow the user to update the virtualization security configuration, as shown at block 224. The security configuration changes to be applied may include changes to the white list of approved VMMs, changes to the black list of disapproved VMMs, changes to the local or remote location for storing the white list and/or black list, setting processing system 20 to disallow all VMMs, setting processing system 20 to allow any VMM, etc.

Processing system 20 may then leave the PEI phase and enter the DXE phase. In the DXE phase, BIOS 50 may launch BIOS boot services and BIOS runtime services, as shown at block 230. In particular, in the example embodiment, the DXE phase includes multiple stages, including a pre-system management mode (SMM) stage, an SMM stage, and a post-SMM stage. In the first two stages, BIOS 50 only runs DXE drivers from the processor vendor or platform vendor. BIOS 50 runs third-party code only after the DXE SMM stage, in the EFI driver/application phase of execution. Also, as shown at block 232, BIOS 50 may lock flash memory, SMM memory (SMRAM), etc. in the DXE post-SMM stage.

After the SMM stage of DXE, and possibly after locking flash memory, SMRAM, etc., BIOS 50 may then cause additional components to be initialized. For example, BIOS 50 may call code in option ROMs of components such as add in cards.

BIOS 50 may also launch STM 64 during the DXE phase. Once launched, STM 64 may serve as a peer monitor that guest-hosts the SMM code. For instance, STM 64 may guard against third part SMM code from damaging the main VMM. Some processing systems may be configured so that SMIs are delivered to the main VMM. Alternatively, a processing system may be configured so that SMIs are delivered directly to the 16-bit SMM code.

As indicated at block 234, processing system 20 may then enter the BDS phase, and BIOS 50 may select a boot device. The boot device may be selected based in part on a predetermined, ordered list of preferred boot device, which may be set by a system administrator and saved in processing system 20 in non-volatile storage (e.g., as a driver load list in complementary metal-oxide-semiconductor (CMOS) memory). Processing system 20 may then enter the TSL phase, and BIOS 50 may transfer control to an OS boot loader on the selected boot device, as shown at block 236. The OS boot loader may load an OS kernel. This OS kernel may be referred to as the root OS. However, when the root OS includes code for creating VMs, the root OS may be considered a VMM. Alternatively, the root OS may launch a separate VMM. Either of those two types of VMMs is represented by VMM 52 in FIG. 1.

As shown at block 238 of FIG. 2, processing system 20 may then enter the RT phase, with VMM 52 executing on processor 22 in the VMX root operating mode.

In the RT phase, VTA 66 may act as a filter that passes most instructions from VMM 52 through to the hardware. However, as shown at block 240, VTA 66 may intercept certain privileged instructions, and then check policy settings to determine whether or not to allow those instructions to execute. For instance, VTA 66 may trap instructions for transitioning processor 22 from VMX root operating mode to VMX non-root operating mode (e.g., VMLAUNCH, VMRESUME, VMRUN). For purposes of this disclosure, instructions for transitioning a processor from VMX root operating mode to VMX non-root operating mode are referred to in general as VM enter instructions. VTA 66 may also trap instructions for loading the global descriptor table (LGDT), popping flags from the stack (POPF), or any other privileged instruction.

In the example embodiment, VTA 66 use hardware support that is provided by processor 22 to trap the instructions of interest. For instance, VTA 66 may set processor 22 to automatically execute a VM exit to exit from the VM guest whenever a program (e.g., VMM 52) executes a VM enter instruction to enter the VM guest.

When VTA 66 traps a VM enter instruction, VTA 66 may determine whether processing system 20 is set to secure VMM mode, as shown at block 244. If processing system 20 is not set to secure VMM mode, VTA 66 may simply terminate itself and allow the VM enter instruction to execute, with control then transferred to the code module to launch in the VM, as indicated at blocks 252, 254, and 256.

However, if processing system 20 is in secure VMM mode, VTA 66 may then determine whether the code module that issued the VM enter instruction (e.g., root OS or VMM 52) is an approved VMM, as shown at block 248. For example, as indicated above, VTA 66 may take a hash measurement of VMM 52 and compare the result with a list of approved or disapproved VMMs, as indicated above. In particular, in the example embodiment, VTA 66 may look at the instruction point which engendered the launch, work backward to find a well-formed PE/COFF image (in the case of an executable), and check the hash of the entire image. In other cases, the white list or black list may contain the base, length, and expected hash (or digital signature) of the authorized or unauthorized VMMs. Alternatively, VMM 52 may include a digital signature (e.g., one based on Rivest Shamir Adleman (RSA) or elliptic-curve cryptography, and the white list may have a certificate chain with the public key, in order to verify the identity and the integrity of the candidate VMM.

As shown at block 260, if the candidate code module does not pass authorization, VTA 66 may trigger a fault, an exception, or take any other suitable steps to provide notification that an unauthorized code module (e.g., a VMM, hypervisor, or root OS) has been detected, and to prevent that code module from launching a VM or performing any subsequent operations. On the other hand, if the candidate code module passes authorization, VTA 66 may terminate itself and allow the VM enter instruction to execute, with control then transferred to the code module to launch in the VM, as indicated at blocks 252, 254, and 256.

Thus, before allowing a VMM to launch any VMs, VTA 66 may determine whether that VMM is an authorized VMM. VTA 66 may then prevent an unauthorized VMM from creating any VMs. Alternatively, if the trap is triggered after the VM enter executes, VTA 66 may prevent the VM from performing any operations after the VM enter. Whether the trap occurs just after the VM enter or in place of the VM enter, VTA 66 does not allow any operations from the requested VM. For instance, VTA 66 may immediately execute a VM exit, thus intercepting the attempt to transition the data processing system to virtual machine (VM) operating mode.

The types of VMMs that may be verified include VMMs stored on a mass storage device such as a local or remote disk drive, as well as VMMs stored in third-party option ROMs. Accordingly, VTA 66 may prevent a VMM that launches as a kernel mode driver of an OS from executing any protected virtualization functions, such as creating a VM. Furthermore, since VTA 66 may launch before any third-party option ROMs are executed, VTA 66 may prevent those option ROMs from launching unauthorized VMMs.

The VTA may also trap instructions for determining whether or not a processor supports virtualization, such as instructions for reading model specific registers (MSRs) associated with virtualization support. In response to a code module attempting to execute such instructions, the VTA may determine whether the code module is authorized, for instance by measuring the module and checking that measurement against one or more predetermined lists, as indicated above. For authorized modules, the VTA may allow the instruction to complete normally. For unauthorized modules, the VTA may instead return a result to indicate that the processor does not support virtualization.

For instance, a processing system may be sold with a lightweight VMM that supports remote platform management, and that processing system may include a white list that includes a measurement of that VMM. During the boot process, when the VMM attempts to executed a protected operation, the VTA may measure the VMM and allow the operation to proceed if the measurement tests good. However, if any other VMM were to attempt a protected operation, the VTA may prevent that operation from executing, for instance by returning a response to indicate that the CPU does not support virtualization.

In present or future platforms, a processor may provide instructions for launching a VMM and recording its state into a TPM. Alternatively, a processing system may use a VTA according to the present disclosure. Instead of just measuring the VMM, the VTA may measure the VMM, record the state in a TPM, verify whether the VMM is authorized, and prevent an unauthorized VMM from performing further operations.

In some embodiments, the VTA may only occupy approximately 100,000 (100K) bytes in the system ROM. In some embodiment, the VTA may itself be implemented as a VMM or a hypervisor. In one embodiment, the candidate code module to be checked for authorization may be a so-called "type 1" VMM that includes a root OS or operates on a logical level below a root OS. In another embodiment, the candidate code module may be a so-called "type-2" VMM that operates on top of a root OS. Alternatively, the candidate code module may be a different type of software that attempts to use protected virtualization features, such as creating a VM.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for protecting a data processing system, the method comprising:

launching an operating system (OS) during a boot process in a data processing system that supports a virtualization enabled (VE) operating mode;

selecting a boot device for loading the OS;

before selecting the boot device and before launching the OS, launching a trap agent;

with the trap agent, intercepting an attempt to transition the data processing system to virtual machine (VM) operating mode after the OS has been launched; and in response to intercepting the attempt to transition the data processing system to VM operating mode, automatically determining whether a program that requested the transition is an authorized program.

2. A method according to claim 1, further comprising:

preventing the program from transitioning the data processing system to VM operating mode if the program is not authorized.

3. A method according to claim 1, comprising:

launching the trap agent before handing off to an OS loader.

4. A method according to claim 1, comprising:

launching the trap agent before executing any code from any third-party option memories in the data processing system.

5. A method according to claim 1, wherein the data processing system comprises a processor provided by a processor manufacturer and assembled with other components to produce the data processing system by a system manufacturer, the method comprising:

launching the trap agent before executing any code provided by any entity other than the processor manufacturer or the system manufacturer.

6. A method according to claim 1, comprising:

executing the trap agent with the processor in a virtualization enabled (VE) mode.

7. A method according to claim 1, further comprising:

terminating the trap agent if the program is authorized; and allowing the program to transition the data processing system to VM operating mode.

8. A method according to claim 1, further comprising:

after launching the trap agent, allowing instructions that do not pertain to virtualization to be executed without interference from the trap agent.

9. An apparatus comprising:

a machine-accessible medium; and instructions in the machine-accessible medium, wherein the instructions, when executed by a data processing system that supports a virtualization enabled (VE) operating mode, cause the data processing system to perform operations comprising:

launching an operating system (OS) during a boot process in the data processing system;

selecting a boot device for loading the OS;

before selecting the boot device and before launching the OS, launching a trap agent;

with the trap agent, intercepting an attempt to transition the data processing system to virtual machine (VM) operating mode after the OS has been launched; and in response to intercepting the attempt to transition the data processing system to VM operating mode, automatically determining whether a program that requested the transition is an authorized program.

10. An apparatus according to claim 9, wherein the instructions cause the data processing system to perform further operations comprising:

preventing the program from transitioning the data processing system to VM operating mode if the program is not authorized.

11. An apparatus according to claim 9, wherein the instructions cause the data processing system to perform operations comprising:

launching the trap agent before handing off to an OS loader.

12. An apparatus according to claim 9, wherein the instructions cause the data processing system to perform operations comprising:

launching the trap agent before executing any code from any third-party option memories in the data processing system.

13. An apparatus according to claim 9, wherein the data processing system comprises a processor provided by a processor manufacturer and assembled with other components to produce the data processing system by a system manufacturer, and wherein the instructions cause the data processing system to perform operations comprising:

launching the trap agent before executing any code provided by any entity other than the processor manufacturer or the system manufacturer.

14. An apparatus according to claim 9, wherein the instructions cause the data processing system to perform operations comprising:

executing the trap agent with the processor in a virtualization enabled (VE) mode.

15. An apparatus according to claim 9, wherein the instructions cause the data processing system to perform further operations comprising:

terminating the trap agent if the program is authorized; and allowing the program to transition the data processing system to VM operating mode.

16. An apparatus according to claim 9, wherein the instructions cause the data processing system to perform operations comprising:

after launching the trap agent, allowing instructions that do not pertain to virtualization to be executed without interference from the trap agent.

17. A data processing system comprising:

a processing unit that supports a virtualization enabled (VE) operating mode;

non-volatile storage in communication with the processing unit;

system read-only memory (ROM) in communication with the processing unit; and instructions in the system ROM, wherein the instructions, when executed, cause the data processing system to perform operations comprising:

launching a trap agent before selecting a boot device for loading an operating system (OS) and before launching the OS during a boot process in the data processing system;

with the trap agent, intercepting an attempt to transition the data processing system to virtual machine (VM) operating mode after the OS has been launched; and in response to intercepting the attempt to transition the data processing system to VM operating mode, automatically determining whether a program that requested the transition is an authorized program.

18. A data processing system according to claim 17, wherein the instructions in the system ROM comprise the trap agent.

19. A data processing system according to claim 17, wherein the instructions cause the data processing system to perform further operations comprising:

preventing the program from transitioning the data processing system to VM operating mode if the program is not authorized.

20. A data processing system according to claim 17, wherein the instructions cause the data processing system to perform operations comprising:

launching the trap agent before handing off to an OS loader.

21. A data processing system according to claim 17, wherein the instructions cause the data processing system to perform operations comprising:

launching the trap agent before executing any code from any third-party option memories in the data processing system.

22. A data processing system according to claim 17, wherein the instructions cause the data processing system to perform operations comprising:

launching the trap agent before executing any code provided by any entity other than a processor manufacturer for the processor or a system manufacturer for the data processing system.

23. A data processing system according to claim 17, wherein the instructions cause the data processing system to perform operations comprising:

executing the trap agent with the processor in a virtualization enabled (VE) mode.

24. A data processing system according to claim 17, wherein the instructions cause the data processing system to perform further operations comprising:

terminating the trap agent if the program is authorized; and
allowing the program to transition the data processing system to VM operating mode.

25. A data processing system according to claim 17, wherein the instructions cause the data processing system to perform operations comprising:

after launching the trap agent, allowing instructions that do not pertain to virtualization to be executed without interference from the trap agent.

* * * * *